United States Patent [19]

Pickstock et al.

[11] 3,780,222

[45] Dec. 18, 1973

[54] ELECTRONIC WEAVE COMPENSATION

[75] Inventors: Barry Thomas Pickstock, London; Denis Manktelow Neale, Brentwood, both of England

[73] Assignee: EVR Enterprises, London, England

[22] Filed: Mar. 13, 1972

[21] Appl. No.: 234,166

[30] Foreign Application Priority Data

Mar. 12, 1971 Great Britain .................... 6,772/71

[52] U.S. Cl. .......................... 178/7.2, 178/DIG. 28

[51] Int. Cl. ............................................ H04n 5/36

[58] Field of Search ...................... 178/6.7 A, 5.2 D, 178/DIG. 28, 7.2

[56] References Cited

UNITED STATES PATENTS

| | | | |
|---|---|---|---|
| 3,221,337 | 11/1965 | Quinn | 178/6.7 A |
| 3,234,326 | 2/1966 | Goldmark | 178/6.7 A |
| 3,517,118 | 6/1970 | Herman | 178/6.7 A |
| 3,571,503 | 3/1971 | McMann | 178/6.7 A |
| 3,585,293 | 6/1971 | Crowder | 178/6.7 A |
| 3,609,228 | 9/1971 | Goldmark | 178/6.7 A |

*Primary Examiner*—Howard W. Britton
*Attorney*—Spencer E. Olson et al.

[57] ABSTRACT

In a system for reproducing television signals from a photographic record medium in which the film is scanned by a flying spot scanner as it is transported through a film gate, apparatus for reducing the effect of lateral weave of the film as it passes through the gate. The effect of weave in the finally reproduced television signal is reduced by generating a weave compensation signal representative of the deviation of the film record medium from a standard datum, and then using that signal to effect an appropriate transverse movement of the scanning raster as to compensate for transverse movement of the film as it passes the scanning gate.

3 Claims, 1 Drawing Figure

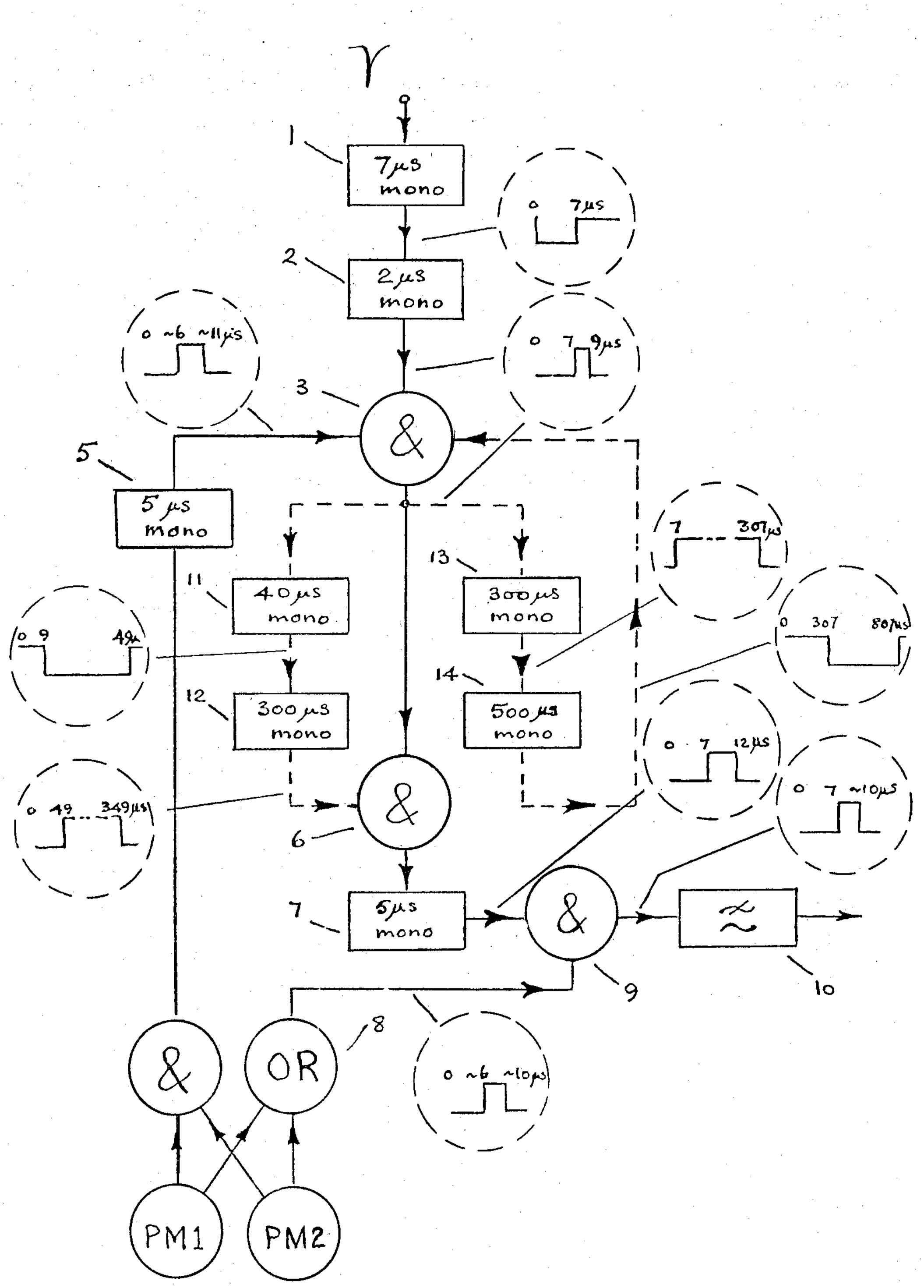
γ
7μs mono
2μs mono
&
5μs mono
40μs mono
300μs mono
300μs mono
500μs mono
&
5μs mono
&
&
OR
PM1
PM2
1
2
3
5
6
7
8
9
10
11
12
13
14

ELECTRONIC WEAVE COMPENSATION

BACKGROUND OF THE INVENTION

This invention relates to the reproduction of television signals from a record medium in the form of photographically recorded images on a photographic film strip.

Systems of television recording and reproduction employing such a record medium are described, for example, in British Specification No. 1131772 and in the following papers: P. C. Goldmark et al., Journal of the SMPTE, Vol. 79, pages 677–686 and Sir Francis McLean, Royal Television Society Journal, 12 No. 8, winter 1969, pages 177–181 and reference should be made to these sources for the general description of the system used.

In the reproduction of the television signals from the photographic record medium, the record medium is led through a film gate in which it is scanned electronically, by means of a flying spot, line scan raster generated to extract the information. Two portions of the film record are scanned simultaneously by the focussed flying spot line scan raster, and the required signals derived from the response of photoelectric multiplier cells placed behind the film in the gate.

As in all mechanical systems of this type, in which a film is led through a gate, there is a tendency for the film to weave laterally as it passes through the gate. If, as is customary, the scanning of the film is performed with precise regularity, then this weave will be transferred to the finally reproduced signal, and the television picture as viewed will also tend to weave laterally. This is undesirable, but any attempt to reduce weave mechanically, e.g. by modifying the gate design, tends to increase wear on the record medium, and to decrease the ability of the gate to accept record media of slightly differing widths, due for example to slitting tolerances.

SUMMARY OF THE INVENTION

According to the present invention, weave in the finally reproduced television signal is reduced by generating a weave compensation signal representative of the deviation of the film record medium from a standard datum, and then using that compensation signal to effect an appropriate deflection of the line scan raster. By this means, the line scan raster is moved transversely in such fashion as to compensate for transverse movement of the film record as it passes through the scanning gate, and thus the weave of the viewed television image is reduced.

The weave compensation signal may be generated by comparing in time the linescan raster itself and the signals received from the photomultiplier cells insofar as they correspond to the lateral position of a recorded image on the film record, and in order to avoid errors, the recorded image chosen is preferably a unique one such as a recorded register image which occurs in invariant form along the length of the film recorded. Part of the recorded image on the film record is in the form of a series of film frames, and if desired, the time at which the side edge of the film frame is scanned may be compared with the linescan timing raster in order to generate a weave compensation signal. However, since in some cases the film frame may have a picture content which would appear to be the side of the frame — e.g. a picture of vertical black and white stripe, it is preferred to detect weave not on the frames containing the recorded picture information (either chrominance or luminance information being recorded on any one frame) but on the synchronisation marks which are usually present on the film record. These marks, which may be present for each, or each alternate, frame, represent a signal which is invariant in that it is independent of the recorded signals. Thus, it is particularly preferred to generate a weave compensation signal by comparing, in time, the line scanning waveform which is applied to generate the line scan raster, with the time at which the image of that raster crosses the edge of a synchronisation mark on the film record. The synchronisation marks are usually in the form of transparent areas on a black ground, and are accordingly referred to for simplicity as "sync. windows". These windows are usually of height (i.e. dimension in the direction along the film record) corresponding to about 10 lines of the linescan raster. It is preferred, in order to generate an adequate weave compensation signal, to provide a sync. window associated with each frame of the film record, and to ensure that the weave compensation signal is only generated from images of the flying spot which performs the scanning raster which cross the whole of the width of the sync. window. Preferably, the weave compensation signal is derived in the form of a pulse, the leading edge of which is in fixed time relation to the line scanning raster, and the trailing edge of which is determined by the point in time the scanning spot passes the side edge of a sync. window. The pulse length will vary directly as the film weaves, and this can be used in known fashion to deflect the scanning raster accordingly.

BRIEF DESCRIPTION OF THE DRAWING

By way of example, the invention is further illustrated in the accompanying drawing, which is a block diagram of a circuit for producing a weave compensation signal by comparing the line scanning raster and the pulses received by photomultiplier cells corresponding to the position of the sync. windows.

DESCRIPTION OF THE PREFERRED EMBODIMENT

Referring to the drawing, the operation of the device is as follows:

A negative-going line sync. or flyback pulse is applied to the input of monostable, 1, which responds by generating a 7 microsecond negative-going pulse. All times are here related to the input pulse and hence the output of 1 is negative from 0 to 7 microseconds, positive thereafter. Monostable 1 drives monostable 2 which delivers a positive pulse over the period 7 to 9 microseconds into an AND gate 3.

Photomultipliers PM1 and PM2 correspond to the luminance and chrominance channels respectively and are situated behind the film record in a gate. They receive light from a scanning raster and through the film record. If light is received from sync. windows associated with both chrominance and luminance frames, AND gate 4 opens and monostable 5 delivers a 5 microsecond positive pulse to the AND gate 3. Since line flyback takes some 6 microseconds, this pulse will extend from about 6 to 11 microseconds from datum. Thus (neglecting the loops shown in broken lines, the operation of which is explained below) the time at which gate 3 opens is determined by monostable 2. The output of monostable 2 therefore passes through gates 3 and 6 to monostable 7 which generates a positive pulse during the period 7 to 12 microseconds from datum.

Photomultipliers PM1 and PM2 will receive light through the sync. windows until the scanning spots enter the picture/chroma area, i.e. the full frame areas on the film which contain the signal information. This occurs at approximately 10 microseconds, the precise time depending on image position i.e. on the lateral position of the film record. Over the period 6 to 10 microseconds approximately, the outputs of PM1 and PM2 are combined in an OR gate 8 which feeds an AND gate 9. Thus, irrespective of any dirt or scratches in the sync. windows, gate 9 is opened at 7 microseconds and closes at approximately 10 microseconds, the precise closure time being dependent on image position, i.e. on the weave. The output of gate 9 passes a low-pass filter 10 to provide a d.c. output to be amplified and applied to the deflection yoke of the cathode ray tube used to generate the linescan raster, in order to displace the raster in the direction of line scan, and so to compensate for lateral weave.

On scanning the first and last lines of a sync. window, the simple system thus far described might produce false results due to one or both of the scanning spots crossing obliquely the horizontal edge of a window i.e. the edge transverse to the film record length. Additional monostables 11 and 12 ensure that gate 6 opens 40 microseconds after the first detected sync. window signal. Hence only the second and subsequent pulses are permitted to pass gates 6 and 9.

Monostables 13 and 14 close gate 3 after five sync. window lines have been detected. Hence only the 2nd–5th pulses emerge from gate 9.

The use of these monostables 11 – 14 additionally protects the weave compensation system from the effects of vertical jitter.

Since, by means of this invention, weave in the film gate may be compensated, weave in the film gate may be better tolerated, and this enables film gate design to concentrate more on not harming or wearing the film record rather than on maintaining it in a fixed nonweaving position. We claim:

1. In an apparatus for scanning a film having a succession of frames disposed vertically along its length, the apparatus including a means for moving the film in a vertical direction past a scanning position, means for scanning the frames with a beam in a horizontal scanline pattern at the scanning position, photosensitive means for receiving the scanning beam and generating an electronic video signal representative of information in said frames, and display means responsive to the electronic video signal for displaying a reproduction of the information in said frames; a method of reducing horizontal weave in the displayed reproduction caused by horizontal motion of the film, comprising the steps of:

a. deriving from said photosensitive means a reference signal which corresponds in time to the relative horizontal position of the frame being scanned;
b. comparing the timing of said reference signal to the timing of the horizontal scanline pattern and generating a compensation signal which reflects the comparison; and
c. applying the compensation signal to adjust the relative horizontal position of the display.

2. In an apparatus for scanning a film having a succession of frames and synchronization marks disposed vertically along its length, the apparatus including a means for moving the film in a vertical direction past a scanning position, means for scanning the frames with a beam in a horizontal scanline pattern at the scanning position, photosensitive means for receiving the scanning beam and generating an electronic video signal representative of information in said frames and the timing of said synchronization marks, and display means responsive to the electronic video signal for displaying a reproduction of the information in said frames; a method of reducing horizontal weave in the displayed reproduction caused by horizontal motion of the moving film, comprising the steps of:

a. deriving from said photosensitive means a reference signal which corresponds in time to the relative horizontal position of a synchronization mark being scanned;
b. comparing the timing of said reference signal to the timing of the horizontal scanline pattern and generating a compensation signal which reflects the comparison; and
c. applying the compensation signal to adjust the relative horizontal position of the display.

3. The method as defined by claim 2 wherein the step of deriving a reference signal comprises deriving a signal in the form of a pulse, the trailing edge of the pulse being determined by the point in time at which the scanning beam crosses a side edge of a synchronization mark.

* * * * *